US012124565B2

(12) United States Patent
Veettikattil et al.

(10) Patent No.: US 12,124,565 B2
(45) Date of Patent: Oct. 22, 2024

(54) TAMPER DETECTION FOR EXECUTABLE APPLICATIONS

(71) Applicant: Adobe Inc., San Jose, CA (US)

(72) Inventors: Pratuish Ayanour Veettikattil, Bengaluru (IN); Vikrant Pundir, Bangalore (IN); Vinu C. Warrier, Bangalore (IN)

(73) Assignee: Adobe Inc., San Jose, CA (US)

( * ) Notice: Subject to any disclaimer, the term of this patent is extended or adjusted under 35 U.S.C. 154(b) by 282 days.

(21) Appl. No.: 17/206,989

(22) Filed: Mar. 19, 2021

(65) Prior Publication Data

US 2022/0300606 A1    Sep. 22, 2022

(51) Int. Cl.
*G06F 21/54* (2013.01)
*G06F 21/55* (2013.01)
*G06F 21/64* (2013.01)

(52) U.S. Cl.
CPC ............ *G06F 21/54* (2013.01); *G06F 21/554* (2013.01); *G06F 21/64* (2013.01); *G06F 2221/033* (2013.01)

(58) Field of Classification Search
CPC ........ G06F 21/54; G06F 21/554; G06F 21/64; G06F 2221/033
See application file for complete search history.

(56) References Cited

U.S. PATENT DOCUMENTS

| | | | | |
|---|---|---|---|---|
| 2017/0323120 A1* | 11/2017 | Anderson | ............. | G06F 21/125 |
| 2018/0276374 A1* | 9/2018 | Baldwin | ................. | G06F 21/53 |
| 2019/0205528 A1* | 7/2019 | Bogaert | ................. | G06F 21/121 |
| 2022/0245052 A1* | 8/2022 | Weber | ..................... | G06F 21/14 |

FOREIGN PATENT DOCUMENTS

WO    WO-2013142943 A1 * 10/2013    ........... G06F 16/137

OTHER PUBLICATIONS

Delaware Univ., Newark, DE, USA; A framework for tamper detection marking of mobile applications; 14th International Symposium on Software Reliability Engineering, 2003. ISSRE 2003. (2003, pp. 143-153); (Year: 2003).*
M. Jochen • L.L. Pollock • L.M. Marvel; Tamper detection marking for object files; IEEE Military Communications Conference, 2003. MILCOM 2003. (vol. 2, 2003, pp. 747-751 vol. 2); (Year: 2003).*
P.C. van Oorschot • A. Somayaji • G. Wurste; Hardware-assisted circumvention of self-hashing software tamper resistance; IEEE Transactions on Dependable and Secure Computing (vol. 2, Issue: 2, 2005, pp. 82-92); (Year: 2005).*

* cited by examiner

*Primary Examiner* — Luu T Pham
*Assistant Examiner* — Chao Wang
(74) *Attorney, Agent, or Firm* — Finch & Maloney PLLC

(57) ABSTRACT

Techniques are provided for detecting executable application that is subjected to tampering or unauthorized modification. A checksum for a portion of the executable application is computed at a run time of the executable application by a tamper detection module encoded in the executable application. The tamper detection module compares the checksum to a pre-determined hash value for the portion of the executable application. If the checksum is different from the hash value, the executable application has been tampered with or otherwise modified. The tamper detection module can then cause an alert to be sent to the user and/or the software vendor indicating that the executable application is not genuine.

17 Claims, 11 Drawing Sheets

TAMPER DETECTION FOR EXECUTABLE APPLICATIONS

FIELD OF THE DISCLOSURE

This disclosure relates generally to the field of tamper detection, and more particularly, to techniques for detecting executable application that is subjected to tampering or unauthorized modification.

BACKGROUND

Commercial software, including commercially available off-the-shelf software ("COTS") and open source software, includes computer applications that are designed by software companies for use by customers who purchase these products. For these companies, the ability of the product to meet or exceed a customer's expectations for quality, reliability and performance over the life of the product is critical. However, sometimes third parties tamper with or otherwise modify the application to behave differently than originally designed. Such tampering can include altering the executable portions of the application code to change its functionality or to defeat built-in safeguards and controls, such as by disabling license or copyright restrictions, permitting unauthorized access to sensitive data, bypassing critical sections of code, or reverse engineering the code. Unauthorized tampering or modification can thus harm the integrity of the product.

To address this, several application hardening techniques have been developed for protecting the integrity of the application throughout the entire life cycle of the product. These hardening techniques include restricting access to the kernel, processor, memory, or other devices; closing network ports; establishing intrusion-detection systems, firewalls, and intrusion-prevention systems; deactivating certain functions of the application; or installing other protective measures. All of these aforementioned hardening techniques are proactive in that they aim to prevent unauthorized modification of the application. However, even with existing techniques it is still possible to evade efforts to harden these applications. Consequently, even hardened applications can be tampered with and, in some cases, neither the users nor the software companies that produce the applications may be aware of such tampering. Therefore, what is needed in addition to existing hardening techniques is a way to detect tampering and modification after it has occurred.

SUMMARY

Techniques are provided herein for detecting tampering or unauthorized modification of an executable application. In one example, a checksum for a portion of the executable application is computed at a run time of the executable application by a tamper detection module. The tamper detection module is encoded in (part of) the executable application at a build time of the executable application. The checksum is based on a code location of the portion of the executable application being monitored by the tamper detection module and a code content of the same portion of the executable application. The tamper detection module compares the checksum to a pre-determined hash value for the portion of the executable application. The hash value is pre-determined at the build time of the executable application and, like the checksum, is based on the code location of the portion of the executable application and the code content of the portion of the executable application, such as described above. If the checksum is different from the hash value, the executable application has been tampered with or otherwise modified. The tamper detection module can then cause an alert to be generated and sent to the user and/or the software vendor indicating that the executable application is not genuine. Other mitigation actions can optionally be taken, such as disabling the application or providing the user with an opportunity to replace the tampered application with a genuine version without disabling the tampered application.

Unlike existing hardening techniques, a primary difference between the checksum and the hash value in the disclosed techniques is that the checksum is computed at run time of the executable application, while the hash value is computed at build time of the executable application and encoded in the application by the software vendor. In this manner, the hash value serves as a basis for determining whether the executable application has been tampered with or otherwise modified after build time (that is, after the executable application is created by the vendor). Furthermore, the hash value is not computed locally by the client device, while the checksum is computed locally by the client device. This helps to detect tampering whether or not the hash value is subsequently modified, since it is unlikely that the hash value can be modified to match the checksum without detection. The disclosed techniques also differ from existing techniques in that existing techniques use processes that are not integral to (encoded within) the application for detecting tampering. As such, these external processes are also subject to tampering or interference which could prevent them from performing reliably and accurately, whereas the disclosed techniques, being integral to the application, are far more difficult to corrupt without detection, since the tamper detection processes are provided by the application itself using redundant internal checks. Numerous variations and embodiments of the disclosed techniques will be appreciated in light of this disclosure.

Any number of non-transitory machine-readable mediums (e.g., embedded memory, on-chip memory, read only memory, random access memory, solid state drives, and any other physical storage mediums) are used to encode instructions that, when executed by one or more processors, cause an embodiment of the techniques provided herein to be carried out, thereby allowing for images of products to be associated, for subsequent retrieval, with a context based on the products identified by the neural network. Likewise, the techniques can be implemented in hardware (e.g., logic circuits such as field programmable gate array, purpose-built semiconductor, microcontroller with a number of input/output ports and embedded routines).

DETAILED DESCRIPTION

Figure 1:
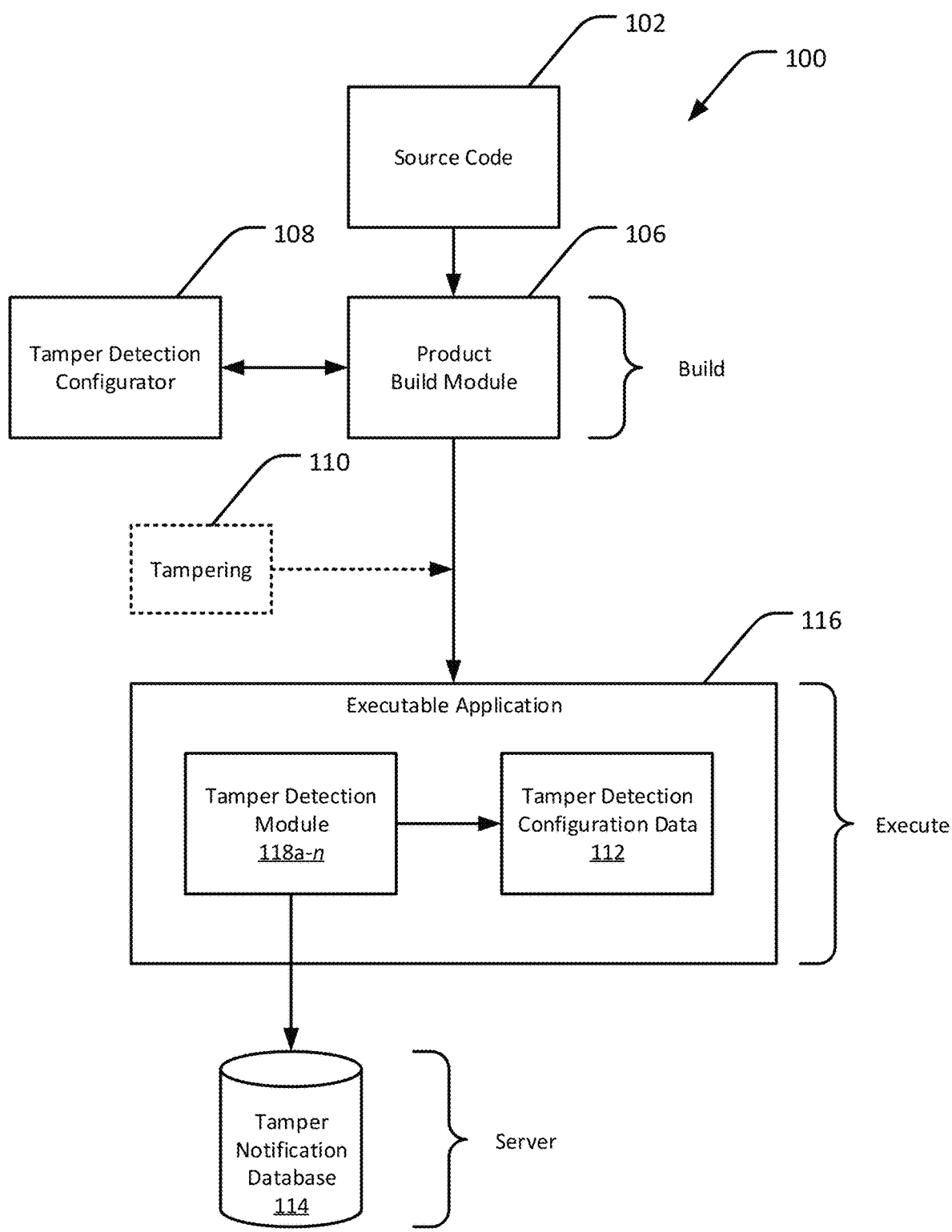
FIG. 1 shows a block diagram depicting an example environment for detecting tampering or modification of an executable application, in accordance with an embodiment of the present disclosure.

Embodiments of the present disclosure relate to techniques for detecting tampering or modification of an executable application. The techniques described herein provide the ability to detect tampering that is not preventable using existing hardening techniques, and to further generate an alert indicating that the application has been tampered with. These techniques further provide the ability to detect whether any of the tamper detection functionality itself has been compromised or otherwise disabled in the executable application, which is not possible using conventional hardening or tamper detection techniques.

In one example, the disclosed techniques generate one or more tamper detection modules configured to monitor one or more portions of the executable application. Each of the tamper detection modules are configured to determine whether those portions of the application have been modified since the application was originally built, and to provide an alert to the user and/or another entity, such as the software company, if any such tampering or modification is detected. The tamper detection modules are configured to monitor specific portions of the executable application, and thus these modules are unique and difficult to reproduce or otherwise modify by tampering. The tamper detection modules are encoded into the executable application at build time, shipped or distributed integrally with the product, and executed at run time along with the rest of the executable application.

The portions of the executable application that are monitored for tampering can include, for example, sections of code configured to activate or deactivate features subject to a software license agreement, sections of code configured to perform critical functions (such as storing transitory data to persistent, non-transitory storage, executing computationally-intensive algorithms, performing security-related or time-sensitive tasks, or any other sections of code configured to perform functions that are to be monitored for tampering. In some examples, only certain portions of the executable application are monitored for tampering, but it will be understood that the disclosed techniques can be used to monitor all of the executable application when so configured. In any event, a separate tamper detection module is generated for each respective portion of the executable application.

In some examples, the detection module is configured to compute a first checksum or other datum derived from a block of the executable application corresponding to the corresponding section of the executable application, and to compare the computed first checksum or other datum with a pre-determined second checksum or other datum for the same section of the executable application. The detection module is further configured to report a mismatch between the first and second checksums or other datum to the user or to a remote server, such as a server maintained by the manufacturer or distributor of the executable application.

At the time the executable application is built, a product build module reads one or more code sections or functions from the executable application and creates a unique checksum for these sections or functions. The product build module is configured, for example, to identify function offsets (locations) and the function size in the executable application. Using this information, the product build module calculates hash values of the corresponding functions using hash algorithms. The hash values are encoded into the executable application for use at run time.

Example Tamper Detection Implementation

FIG. 1 shows a block diagram depicting an example environment 100 for detecting tampering or modification of an executable application 116, in accordance with an embodiment of the present disclosure. An executable application refers to binary encoded instructions that are executable by a computer processor, as opposed to source code, object code, or other types of non-executable code. The executable application 116 can be commercially produced and sold, such as a commercial application for document or image processing and is configured to be executed on a client computing device. Source code 102 for the executable application 116 is provided to a product build module 106, where the source code 102 is compiled or otherwise converted into the executable application 116, as will be appreciated by one of skill in the art. For example, a vendor can use the source code 102 to generate or otherwise build the executable application 116 prior to providing the executable application 116 to an end user or third party. Examples of such executable applications 116 are commercially available programs that can be purchased from the vendor for various purposes, such as word processors, image processors, web browser interfaces, or other uses. These vendor-provided applications are useful because they allow users to perform many tasks on a computer without the difficulty of developing the applications themselves, often at great expense. Such applications can also provide a source of revenue to the vendor. In this sense, it is important for the vendor to ensure the integrity of the application after it is built and provided to the user, since any intervening tampering 110 or other unauthorized modification of the application could change the behavior of the application, jeopardize the user's experience and satisfaction with the product, or lead to a potential loss of revenue or cause other expenses for the vendor.

Existing techniques that detect any tampering 110 that may occur after the executable application 116 is built rely on external processes that themselves are subject to tampering or corruption. As noted above, such tampering 110 can include any modification to the executable application 116 for any purpose, such as changing the behavior or functionality of the application from the original design, disabling license or copyright restrictions to grant unauthorized access to all or part of the application, enabling unauthorized access to sensitive data, including encrypted data, bypassing critical sections or code to prevent certain functions from executing, or reverse engineering the code to use for other purposes. Historically, many popular applications have been tampered with by third parties, such as for providing counterfeit copies for sale to users. Even if the executable application 116 appears functional to the user, there is no existing mechanism for determining whether the application has been modified since it was originally built (i.e., the application is not a genuine version). For example, if any license restrictions of the executable application 116 are defeated or overridden, the user may have access to functionality that the user would not otherwise have access to. In another example, if the behavior or functionality of the executable application 116 is changed by tampering, then the application may not operate as intended by the user. In many cases, the only indication that the executable application 116 has been tampered with occurs when the user observes unanticipated behavior. Otherwise, the user may have no indication of tampering at all and may even come to believe that the executable application 116 is of poor quality as provided by the vendor. Thus, if the user wishes to resolve any concerns about the executable application 116, the user may need to contact the vendor for support. In this case, if the vendor determines that the user's copy of the executable application 116 is not a genuine copy, the user may have no recourse with the vendor. This is potentially costly to the user and can adversely impact the reputation of the vendor in the eyes of the user.

To this end, embodiments of the present disclosure provide techniques for detecting tampering or modification of an executable application. These techniques include i) generating one or more tamper detection modules 118a-n that are encoded at build time by the product build module 106 in the executable application 116 using a tamper detection configurator 108; and ii) executing the one or more tamper detection modules 118a-n at run time, during execution of the executable application 116. Build time refers to a process for compiling source or object code into an executable binary file or files that can be executed by a computer processor. In this context, the application is not executing at build time, but rather the application and a corresponding set of processor-executable instructions are being generated, for example, by a software vendor for subsequent distribution to one or more end users. A product build is a specific version of the executable application. Run time refers to a period of time when a processor is executing a set of instructions encoded in the executable application. As the executing machine follows the instructions, specific effects are produced in accordance with the semantics of those instructions and their respective functions. By encoding the tamper detection modules 118a-n in the executable application at run time, the application as provided to the end user integrates the disclosed tamper detection techniques with the regular functionality of the application in a single application. In this manner, any tampering with the regular functionality or with the tamper detection functionality can be detected and alerted without relying on hardening or external processes to monitor the integrity of the application.

In more detail, each of the tamper detection modules 118a-n is encoded at a different location within the executable application 116. There can be any number of the tamper detection modules 118a-n, including tens or hundreds encoded in the executable application 116. In some examples, each of the tamper detection modules 118a-n corresponds to a different section of the executable application 116. Such sections can be defined at build time by the vendor to include portions of the executable application 116 that the respective tamper detection modules 118a-n are configured to monitor for tampering. Each section corresponds to one or more functions of the executable application 116. For example, if the executable application 116 includes a section that is configured to enforce an end-user license, one of the tamper detection modules 118a-n can be configured to detect tampering within that section of the executable application 116. If any of the tamper detection modules 118a-n detects tampering within the corresponding section of the executable application 116, the respective module reports the detected tampering to a tamper notification database 114.

Example Computing Environment

Figure 2:
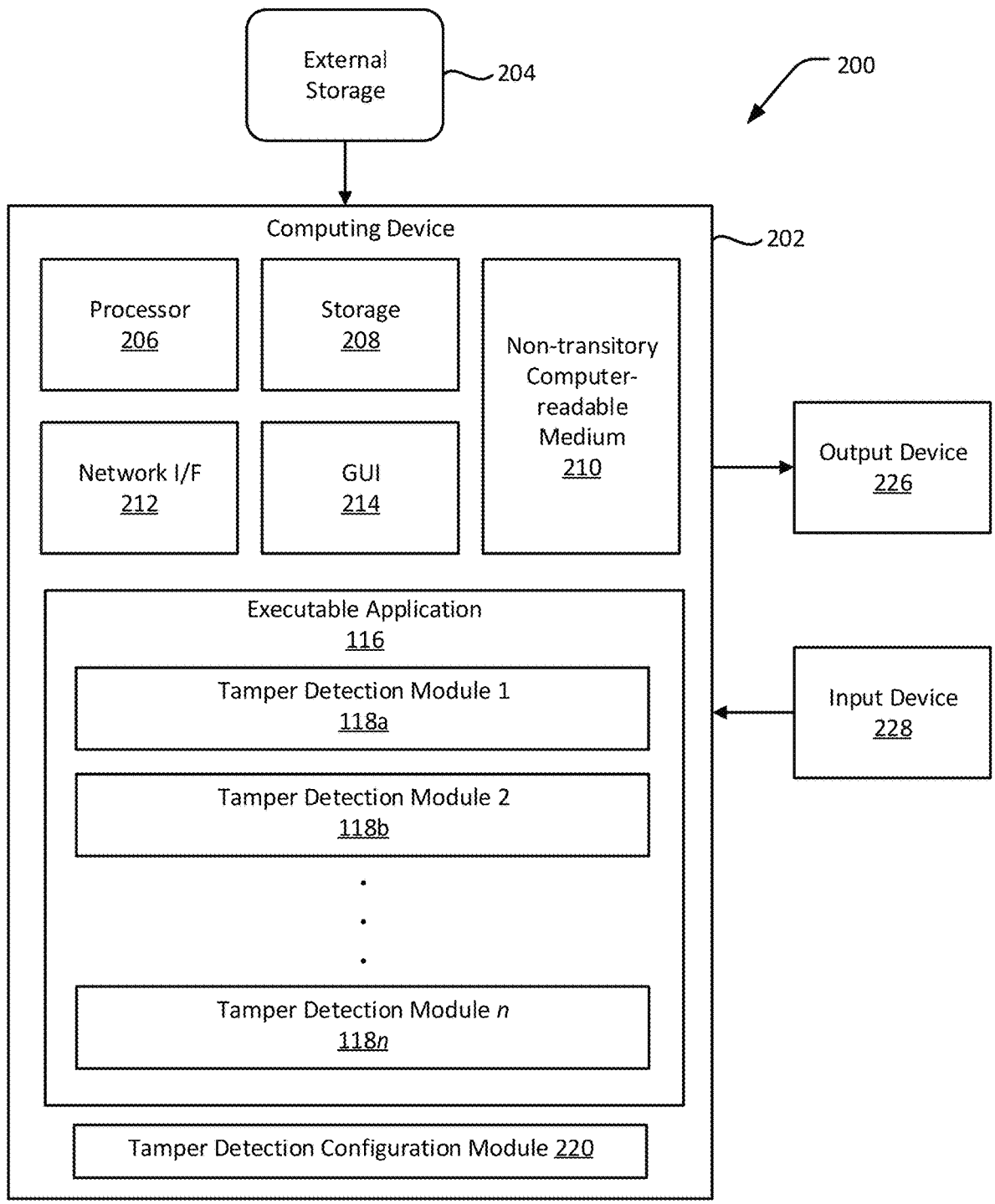
FIG. 2 illustrates an example computing system that can be implemented in the environment of FIG. 1, in accordance with an embodiment of the present disclosure.

FIG. 2 illustrates an example computing system 200 that can be implemented in the environment 100 of FIG. 1, in accordance with an embodiment of the present disclosure. The system 200 includes a computing device 202 having at least one processor 206, one or more storage devices 208, a non-transitory storage medium 210, a network interface (I/F) 212, and a graphical user interface (GUI) 214. The GUI 214 includes or is configured to interact with a display or other user output device 226, and a user input device 228.

According to some embodiments, the processor 206 of the computing device 202 is configured to execute the executable application 116 of FIG. 1, which includes one or more tamper detection modules 118a . . . n, which are described in further detail below. It will be understood that there can be any number of the tamper detection modules 118a . . . n, including tens or hundreds of such tamper detection modules each separately encoded at different locations within the executable application 116. In some other embodiments, the processor 206 of the computing device 202 is configured to execute a tamper detection configuration module 220, which is described in further detail below. The computing device 202 is configured to receive or retrieve the executable application 116 and/or the tamper detection configuration module 220, and any corresponding data, that are stored in an external storage 204 and/or the storage device(s) 208 of the computing device 202. In some embodiments, the external storage 204 is local to the computing device 202 (such as an external hard drive) or remote to the computing device 202 (such as cloud- or network-based storage). The external storage 204 includes, for example, a stand-alone external hard drive, an external FLASH drive or memory, a networked hard drive, a server, and/or networked attached storage (NAS). Each of the modules 118a . . . 118n execute in conjunction with each other to perform a process for detecting an executable application that is subjected to tampering or unauthorized modification using the storage device(s) 208, the external storage 204, or any combination of these.

The computing device 202 is a computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), virtual reality (VR) device or VR component (e.g., headset, hand glove, camera, treadmill, etc.) or other form of computing or telecommunications device that is capable of communication and that has sufficient processor power and memory capacity to perform the operations described in this disclosure. In some embodiments, a distributed computational system is provided including a plurality of such computing devices. Further note that the computing device 202 includes, for example, a client in a client-server environment, where at least a portion of the executable application 116 and/or the tamper detection configuration module 220 is served or otherwise made accessible to the computing device 202 via a network (e.g., the Internet and a local area network that is communicatively coupled to the network interface 212).

The computing device 202 includes one or more storage devices 208 and/or one or more non-transitory computer-readable mediums 210 having encoded thereon one or more computer-executable instructions or software for implementing techniques as variously described in this disclosure. The storage device(s) 208 includes a computer system memory or random access memory, such as a durable disk storage (which includes any suitable optical or magnetic durable storage device, e.g., RAM, ROM, Flash, USB drive, or other semiconductor-based storage medium), a hard drive, CD-ROM, or other computer readable mediums, for storing data and computer-readable instructions or software that implement various embodiments as taught in this disclosure. In some embodiments, the storage device(s) 208 includes other types of memory as well, or combinations thereof. The non-transitory computer-readable medium 210 includes, but is not limited to, one or more types of hardware memory, non-transitory tangible media (for example, one or more magnetic storage disks, one or more optical disks, one or more USB flash drives), and the like. The non-transitory computer-readable medium 210 included in the computing device 202 stores computer-readable and computer-executable instructions or software for implementing various embodiments (such as instructions for an operating system as well as the executable application 116). The computer-readable medium 210 is provided on the computing device 202 or provided separately or remotely from the computing device 202.

The computing device 202 further includes the processor 206, which is configured to execute computer-readable and computer-executable instructions or software stored in the storage device(s) 208 and/or the non-transitory computer-readable medium 210 and other programs for controlling system hardware. In some examples, the processor 206 includes multiple cores to facilitate parallel processing or may be multiple single core processors. Any number of processor architectures can be utilized, such as a central processing unit and co-processor, a graphics processor, and a digital signal processor. In some embodiments, virtualization is employed in the computing device 202 so that infrastructure and resources in the computing device 202 are shared dynamically. For example, a virtual machine is provided to handle a process running on multiple processors so that the process appears to be using only one computing resource rather than multiple computing resources. Potentially, multiple virtual machines are also used with one processor. The network interface 212 includes any appropriate network chip or chipset which allows for wired or wireless connection between the computing device 202 and a communication network (such as a local area network) and other computing devices and resources.

A user interacts with the computing device 202 through the output device 226, which includes a display, screen, or monitor for displaying one or more user interfaces or other information, including at least some outputs of the executable application 116. The user further interacts with the computing device 202 through the input device 228 to receive input from the user via, for example, a keyboard, a joystick, a game controller, a pointing device (e.g., a mouse, a user's finger interfacing directly with a touch-sensitive display device, etc.), or any suitable user interface, including an augmented reality (AR) headset. The computing device 202 may include any other suitable conventional input/output (I/O) peripherals. In some embodiments, the computing device 202 includes or is operatively coupled to various suitable devices for performing one or more of the aspects as variously described in this disclosure.

The computing device 202 runs any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 202 and performing the operations described in this disclosure. In an embodiment, the operating system is run on one or more cloud machine instances.

In other embodiments, the functional components/modules are implemented with hardware, such as gate level logic (e.g., FPGA) or a purpose-built semiconductor (e.g., ASIC). Still other embodiments are implemented with a microcontroller having several input/output ports for receiving and outputting data, and several embedded routines for carrying out the functionality described in this disclosure. In a more general sense, any suitable combination of hardware, software, and firmware are used, as will be apparent.

As will be appreciated in light of this disclosure, the various modules and components of the system, such as the executable application 116, the one or more tamper detection modules 118a-n, the tamper detection configuration module 220, the GUI 114, or any combination of these, may be implemented in software, such as a set of instructions (e.g., HTML, XML, C, C++, object-oriented C, JavaScript®, Java®, BASIC, etc.) encoded on any machine-readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, are performed by one or more suitable processors in any number of configurations and arrangements, and that the depicted embodiments are not intended to be limiting. Various components of this example embodiment, including the computing device 202, are integrated into, for example, one or more desktop or laptop computers, workstations, tablets, smart phones, game consoles, virtual reality (VR) devices, set-top boxes, or other such computing devices. Other componentry and modules typical of a computing system will be apparent.

Executable Application Examples

Figure 3A:
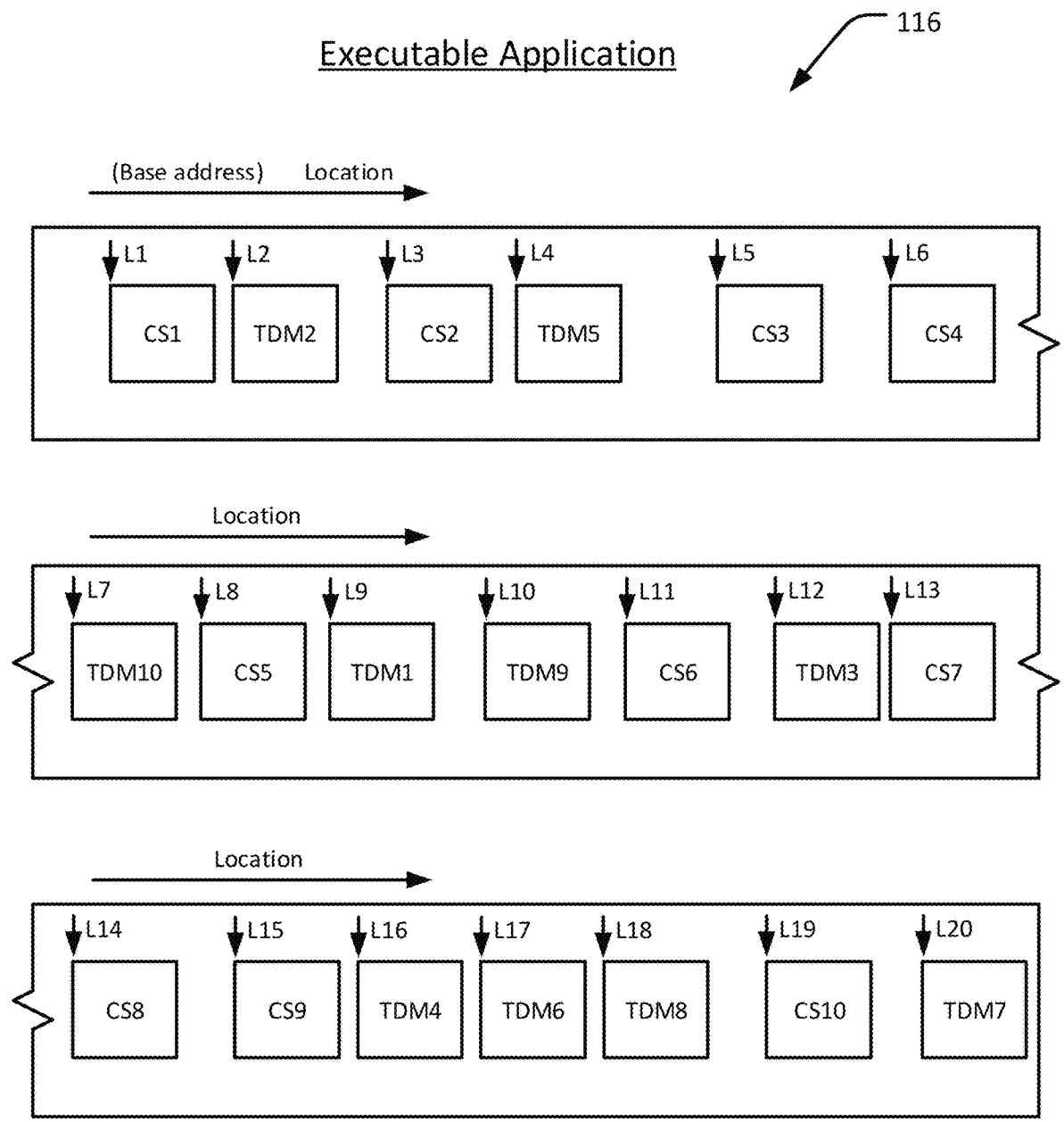
FIGS. 3A-B show an example of the executable application with one or more code sections and one or more corresponding tamper detection modules at various locations within the executable application, in accordance with an embodiment of the present disclosure.

FIG. 3A shows an example of the executable application 116 with one or more code sections CS1-CS10 and one or more corresponding tamper detection modules TDM1-TDM10 at various locations within the executable application 116, in accordance with an embodiment of the present disclosure. Each of the code sections CS1-CS10 represent portions of the executable application 116 that are configured to perform one or more functions of the application, as will be appreciated. The locations of the code sections CS1-CS10 and the tamper detection modules TDM1-TDM10 are depicted relative to, or offset from, a base address of the application. For example, code section CS1 is located at location L1 relative to the base address, tamper detection module TDM2 is located at location L2 relative to the base address, code section CS2 is located at location L3 relative to the base address, etc. It will be understood that the locations of the code sections CS1-CS10 and the tamper detection modules TDM1-TDM10 are application dependent, can vary from one application to another, and can be assigned randomly or in any designated manner at build time. The disclosed techniques can be applied regardless of the specific locations of the code sections CS1-CS10 and the tamper detection modules TDM1-TDM10 within the executable application 116.

In some examples, each of the code sections CS1-CS10 has a corresponding tamper detection module TDM1-TDM10, and the correspondence between these is one-to-one. In other words, tamper detection module TDM1 corresponds to code section CS1, tamper detection module TDM2 corresponds to code section CS2, and so forth. In this manner, tamper detection module TDM1 monitors code section CS1 for tampering or modification but does not monitor any other code section of the executable application 116.

Figure 3B:
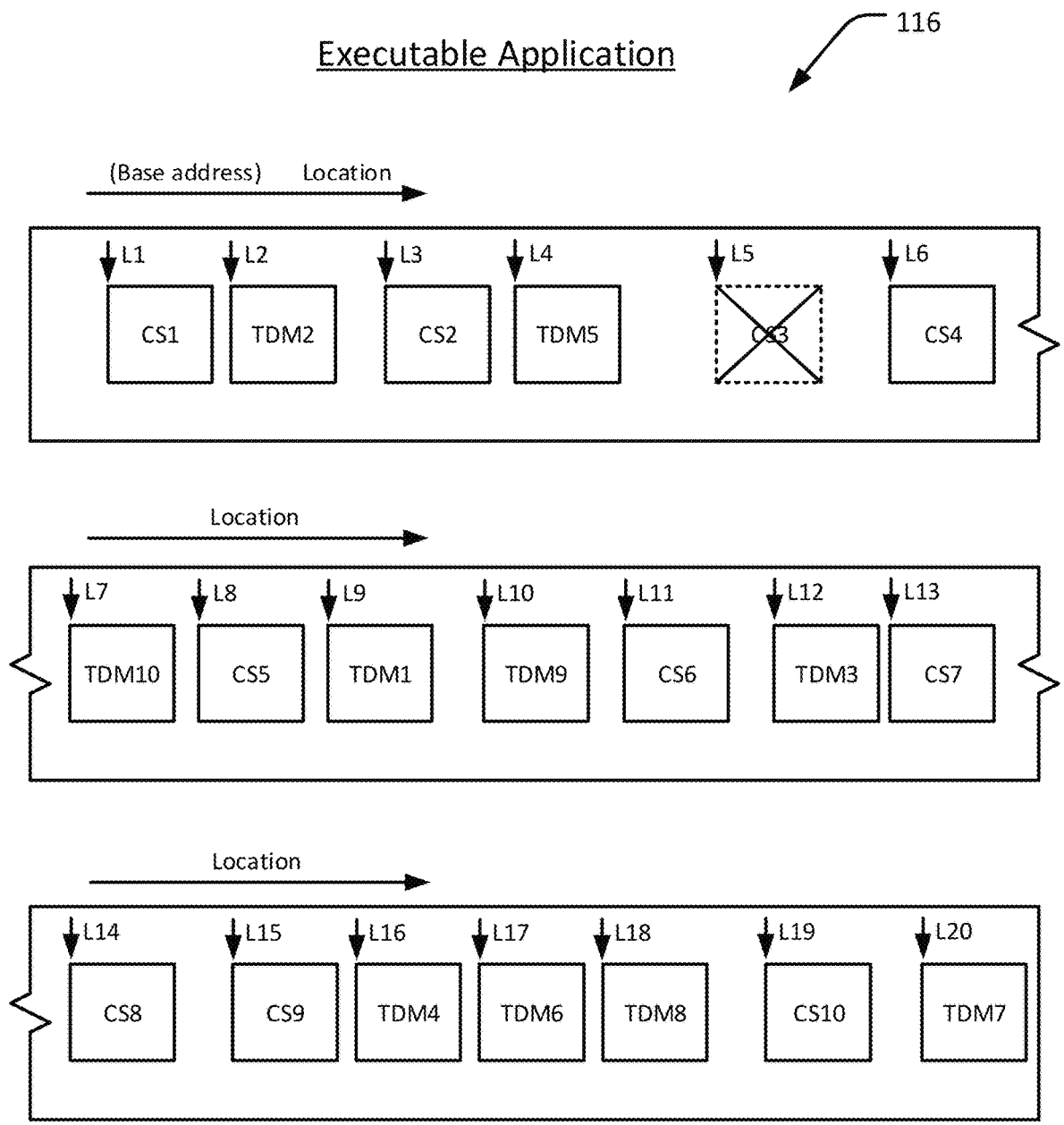

FIG. 3B shows, in accordance with an embodiment of the present disclosure, the executable application 116 where code section CS3 is missing from its designated location (e.g., L5) or otherwise tampered with. In this example, tamper detection module TDM3 is configured to check code section CS3 for tampering (for example, the checksum for CS3 does not match hash value for CS3, such as described with respect to FIGS. 5-7). However, in this case where code section CS3 has been tampered with, the tamper detection modules TDM3 will detect the tampering and cause an alert to be generated to the tamper notification database 114.

The alert can be used in several ways. For example, the alert can be used to display a warning or other message to the user of the executable application 116 indicating that the application is not genuine. In some cases, the user can then download a genuine version of the application to replace the non-genuine version or the application can invoke such a download if authorized to do so by the user or by an existing license to use the executable application 116. Other authorization mechanisms such as single sign-in to an account associated with the executable application 116 can also be used to replace the non-genuine version of the application with a genuine version, or to invite or otherwise extend an offer to the user to discontinue use of the non-genuine version and replace it with a genuine version. In another example, the alert can be used to notify the vendor or manufacturer of the executable application 116 that the user is executing a non-genuine version, such as by sending a message to the tamper notification database 114. Such a message can include, among other things, information about the executable application 116 including, for example, a serial number, version number, or other build data associated with the application, the name of the user and/or the device executing the application, the network address of the device executing the executable application 116, the date and time the alert was generated, and/or other identifying information that can be used to uniquely associate the alert with the executable application 116. In some cases, the vendor and/or the manufacturer can invite or otherwise extend an offer to the user to replace the non-genuine version of the application with a genuine version. In yet another example, the alert can be used to disable all or portions of the executable application 116, with or without notifying the user of such action.

Referring again to FIG. 3A, for example, tamper detection module TDM2 is configured to monitor code section CS2, which is located at L2 within the executable application 116. As noted above, not all portions of the executable application 116 necessarily correspond to a given tamper detection module, and in some examples, portions of the executable application 116 may not correspond to any tamper detection module. Rather, the tamper detection modules can be implemented strategically to detect tampering with specific portions of the executable application 116 rather than the entire application.

In some other examples, one or more of the tamper detection modules 118a-n are configured to detect whether another one of the tamper detection modules 118a-n is not present at its designated location within the executable application 116. As noted above, each of the tamper detection modules 118a-n is encoded at a different location within the executable application 116, such as shown in FIG. 3A. In some examples, the locations of each of the tamper detection modules 118a-n is determined randomly at build time, so the location is not readily evident or detectable. Thus, the tamper detection modules 118a-n can be configured to check on each other for tampering that moves or removes one or more of the tamper detection modules 118a-n from the executable application 116. If any of the tamper detection modules 118a-n detect that another one of the tamper detection modules 118a-n is not present at its designated location within the executable application 116, then the respective module reports the detected tampering to the tamper notification database 114. For example, referring to FIG. 3A, if tamper detection module TDM1 is configured to check on tamper detection module TDM2, and if tamper detection module TDM2 is not at the designated location L2 within the executable application 116, then TDM1 reports the detected tampering to the tamper notification database 114.

Figure 4A:
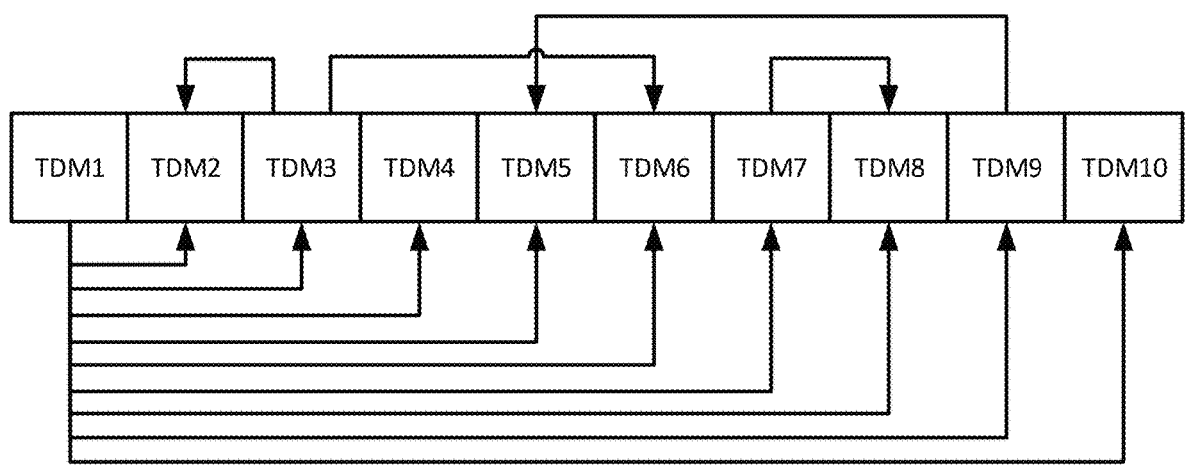
FIGS. 4A-B are block diagrams showing example relationships between the tamper detection modules, in accordance with an embodiment of the present disclosure.

FIG. 4A is a block diagram showing example relationships between the tamper detection modules TDM1-TDM10, in accordance with an embodiment of the present disclosure. As noted above, any of the tamper detection modules 118a-n can be configured to check on other modules for tampering, and it will be understood that the relationships depicted in FIG. 4A represent only one of many different possible configurations. Furthermore, there can be any number of the tamper detection modules 118a-n in the executable application 116, and each module can be configured to check on any of the other modules. For example, as shown in FIG. 4A, tamper detection module TDM1 is configured to check on tamper detection modules TDM2-TDM10; tamper detection module TDM3 is configured to check on tamper detection modules TDM2 and TDM6; tamper detection module TDM7 is configured to check on tamper detection module TDM8; and so forth. It will be understood that the relationships between the tamper detection modules 118a-n is configurable at the build time of the executable application 116. Once the executable application 116 has been built, these relationships remain fixed so that if any one of the tamper detection modules 118a-n is tampered with, removed, or disabled, at least one of the other tamper detection modules 118a-n will detect such tampering, removal, or disablement.

Figure 4B:
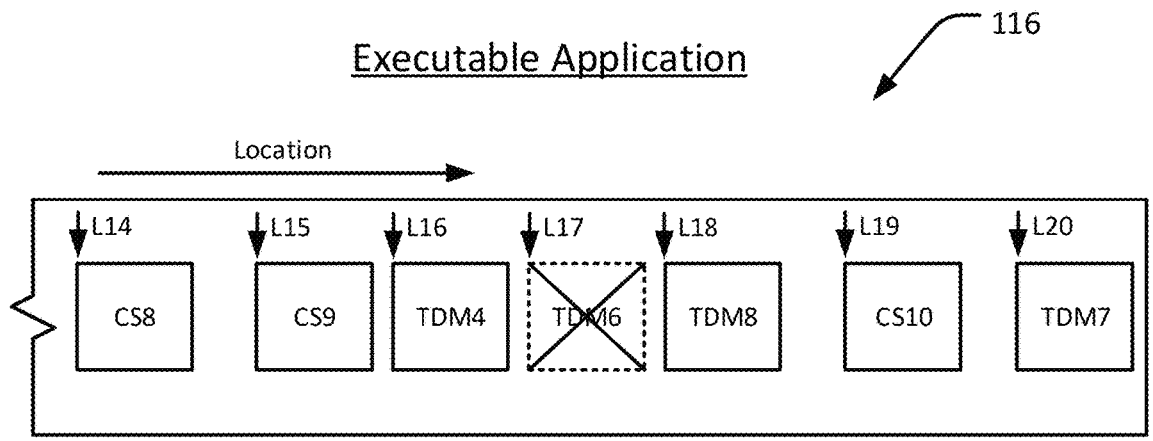
Figure 4B:
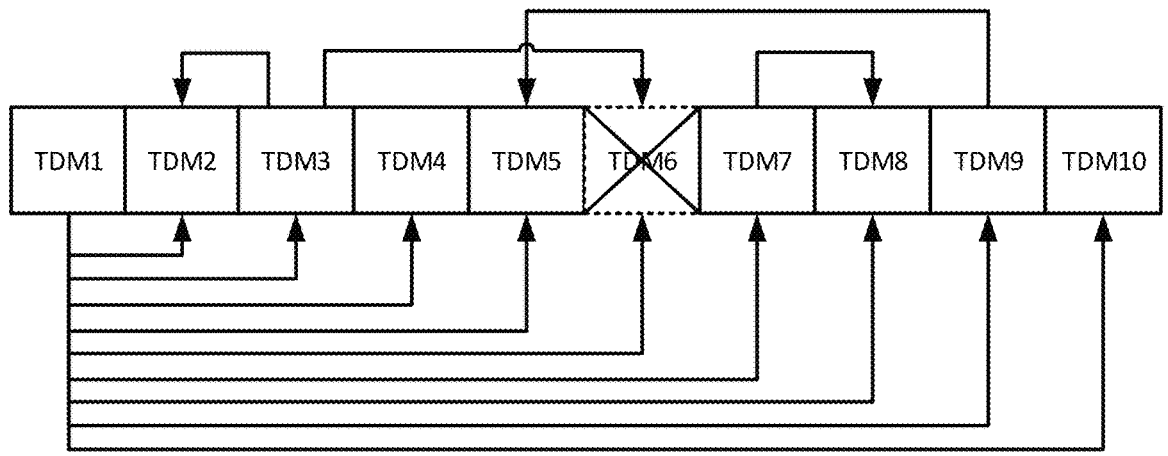

FIG. 4B is a block diagram showing example relationships between the tamper detection modules TDM1-TDM10, where one of the tamper detection modules TDM6 is missing, in accordance with an embodiment of the present disclosure. In this example, tamper detection modules TDM1 and TDM3 are each configured to check for the presence of tamper detection module TDM6. However, in this case where TDM6 has been tampered with and is no longer present at its designated location within the executable application (e.g., L17), either or both of the tamper detection modules TDM1 and/or TDM3 will detect the tampering and cause an alert to be generated to the tamper notification database 114.

Example Methodologies—Run Time (Client Side)

In some embodiments, at the time the executable application is executed (run time on client side), the tamper detection module(s) declares one or more static arrays for hardening variables (such as for function size, offset, and checksum) in the executable application. The hardening variables hold the values which are patched using the tamper detection configuration module. In some examples, the checksum validation is implemented in a binary hardening library. The checksum of each function is validated during run time for in-memory and binary checksums. In some examples, several tamper detection modules are encoded in the executable application to protect different sections of the executable application. As noted above, each of the tamper detection modules is monitored by one or more other tamper detection modules. Each tamper detection module validates the presence of other modules periodically to ensure that the respective tamper detection module has not been modified or removed from the executable application.

Figure 5:
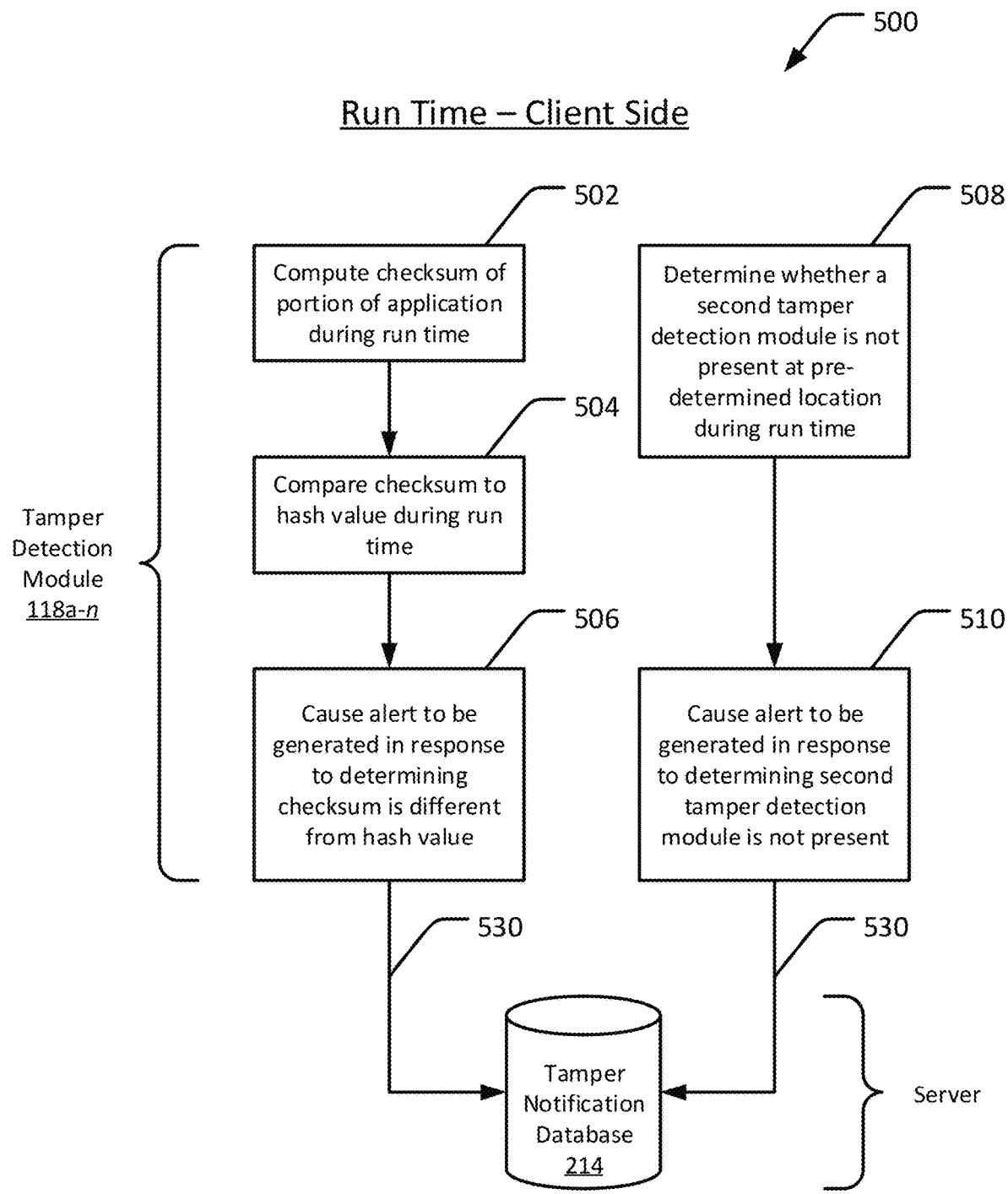
FIG. 5 is a flow diagram of an example methodology for detecting tampering or modification of an executable application, in accordance with an embodiment of the present disclosure.

In more detail, FIG. 5 is a flow diagram of an example methodology 500 for detecting tampering or modification of an executable application, in accordance with an embodiment of the present disclosure. The method 500 can be implemented, for example, in any of the tamper detection modules 118*a*-*n* and/or the tamper detection configuration module 210 of FIG. 1. The method 500 includes computing 502, at a run time of the executable application by a tamper detection module encoded in the executable application, a checksum for a portion of the executable application. For example, referring to FIG. 3A, the tamper detection module can be any of the tamper detection modules TDM1-TDM10 and the portion of the executable application can be any of the code sections CS1-CS10. The checksum is based on a code location of the portion of the executable application and a code content of the portion of the executable application. For example, referring to FIG. 3A, the code locations of the portion of the executable application (CS1-CS10) are L1, L3, L5, L6, L8, L11, L13, L14, L15, and L19. The code content of the portion of the executable application is any code embodied in the code sections CS1-CS10 (e.g., binary code or other executable code).

The method 500 further includes comparing 504, by the tamper detection module, the checksum to a pre-determined hash value for the portion of the executable application. The hash value is pre-determined at a build time of the executable application and, like the checksum, is based on the code location of the portion of the executable application and the code content of the portion of the executable application, such as described above. A primary difference between the checksum and the hash value is that the checksum is computed at run time of the executable application, while the hash value is computed at build time of the executable application. In this manner, the hash value serves as a basis for determining whether the executable application has been tampered with or otherwise modified after build time (that is, after the executable application is created by the vendor). Furthermore, the hash value is not computed locally by the client device, while the checksum is computed locally by the client device. This helps to detect tampering whether or not the hash value is subsequently modified, since it is unlikely that the hash value can be modified to match the checksum without detection.

The method 500 further include causing 506, based on the comparison and by the tamper detection module, an alert to be generated in response to determining that the checksum is different from the hash value. The alert can be provided to the user of the executable application or to the vendor via, for example, the tamper notification database 114, at which point the user and/or the vendor can optionally determine whether or not to take any further action. For example, the vendor may decide to restrict certain functionality of the executable application, such as preventing files from being saved or opened, or terminating other functions of the application, or to take other actions, such as offering the user an opportunity to replace the application with a genuine version through pop-up messages within the application.

In some embodiments, there are multiple tamper detection modules, and each of the tamper detection modules can be configured to check for the presence or absence of another tamper detection module at a designated location. For example, the tamper detection module is a first tamper detection module, and the method 500 further includes determining 508, at the run time of the executable application by the first tamper detection module, whether a second tamper detection module encoded in the executable application is not present at a pre-determined location in the executable application. The pre-determined location is determined at the build time of the executable application, such as shown in FIG. 3A (e.g., the locations of the tamper detection modules TDM1-TDM10 are, not in any particular order, L2, L4, L7, L9, L10, L12, L16, L17, L18, and L20). The method 500 further includes causing 510, by the tamper detection module, the alert to be generated in response to determining that the second tamper detection module is not present at the pre-determined location in the executable application. In this manner, in addition to detecting tampering with any of the code sections of the executable application, the tamper detection modules can also detect tampering with any of the other tamper detection modules. By encoding multiple (e.g., tens or hundreds) of tamper detection modules in the executable application, the risk of undetected tampering with the executable application diminishes.

Figure 6:
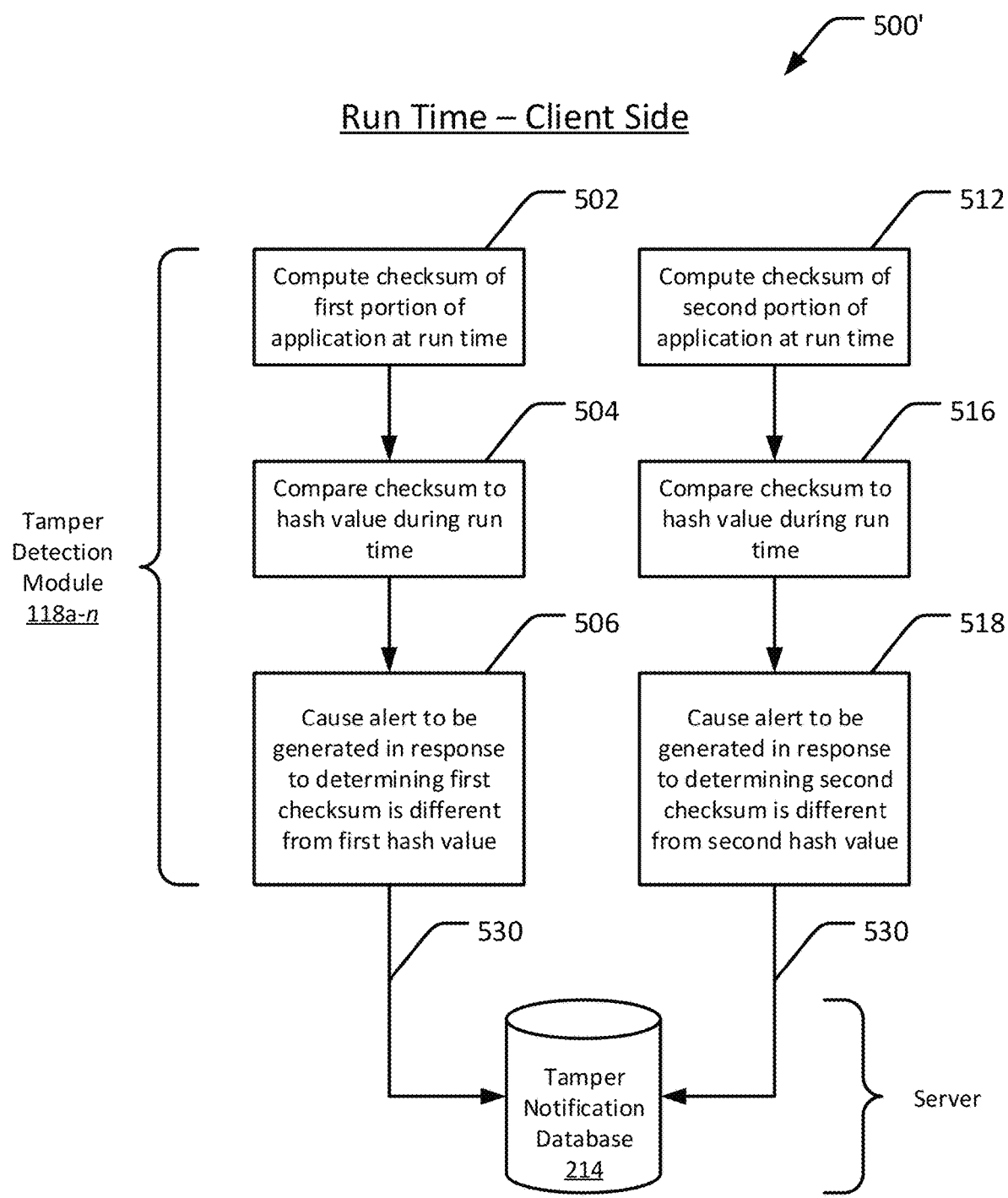
FIG. 6 is a flow diagram of another example methodology for detecting tampering or modification of an executable application, in accordance with an embodiment of the present disclosure.

For instance, FIG. 6 is a flow diagram of another example methodology 500' for detecting tampering or modification of an executable application, in accordance with an embodiment of the present disclosure. In this example, the portion of the executable application is a first (code) portion, the checksum is a first checksum, and the hash value is a first hash value, and the method 500' further includes (with respect to the method 500 of FIG. 5) computing 512, at the run time of the executable application by the second tamper detection module, a second checksum for a second portion of the executable application. The second checksum is based on a code location of the second portion of the executable application and a code content of the second portion of the executable application. The method 500' further includes comparing 516, by the second tamper detection module, the second checksum for the second portion of the executable application to a pre-determined second hash value for the second portion of the executable application. The second hash value is pre-determined at the build time of the executable application and further being based on the code location of the second portion of the executable application and the code content of the second portion of the executable application. The method 500' further includes causing 518, based on the comparison and by the second tamper detection module, the alert to be generated in response to determining that the second checksum is different from the second hash value.

Figure 7:
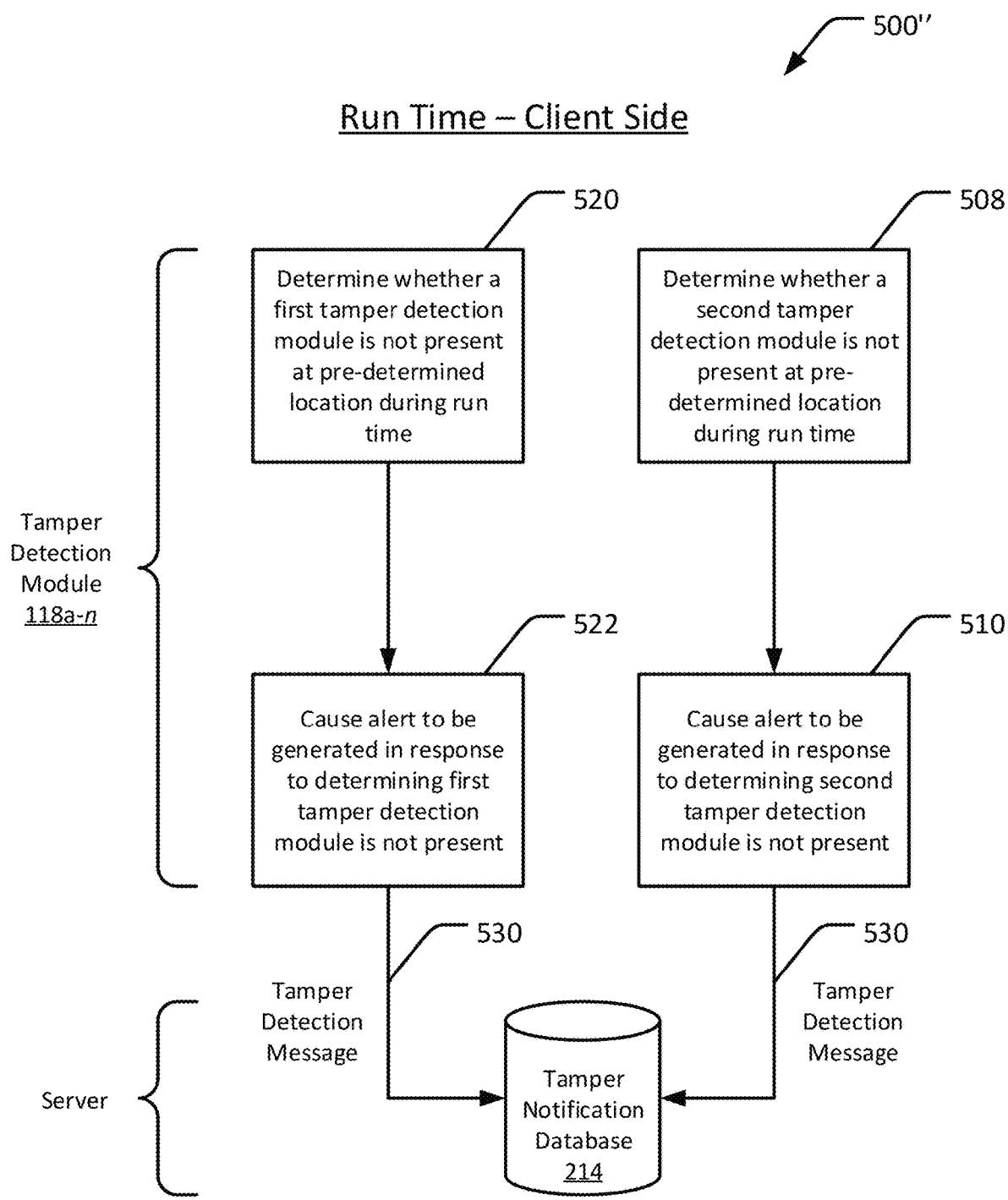
FIG. 7 is a flow diagram of yet another example methodology for detecting tampering or modification of an executable application, in accordance with an embodiment of the present disclosure.

FIG. 7 is a flow diagram of another example methodology 500" for detecting tampering or modification of an executable application, in accordance with an embodiment of the present disclosure. In this example, the pre-determined location of the second tamper detection module is a first pre-determined location, and the method 500" further includes determining 520, at the run time of the executable application by the second tamper detection module, whether the first tamper detection module is not present at a second pre-determined location in the executable application. The second pre-determined location is determined at the build time of the executable application. The method 500" further includes causing 522, by the tamper detection module, the alert to be generated in response to determining that the first tamper detection module is not present at the second pre-determined location in the executable application.

In some embodiments, the methods 500, 500', 500" include causing 530, by the tamper detection module, a tamper detection message to be sent to a remote server in response causing the alert to be generated.

Example Methodologies—Build Time

Figure 8:
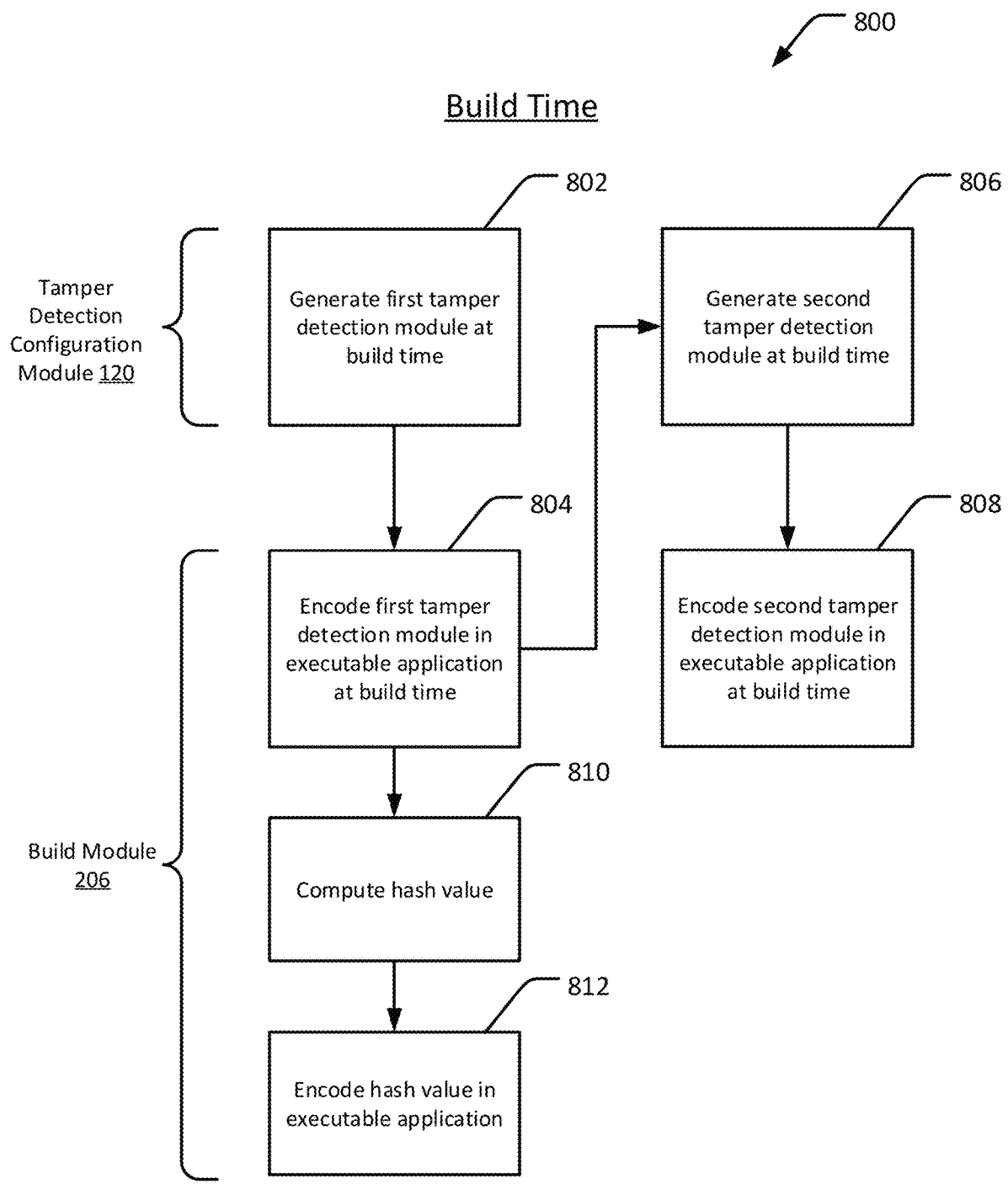
FIG. 8 is a flow diagram of an example methodology for building an executable application with a tamper detection module for detecting tampering or modification of the executable application, in accordance with an embodiment of the present disclosure.

FIG. 8 is a flow diagram of an example methodology 800 for building an executable application with a tamper detection module for detecting tampering or modification, in accordance with an embodiment of the present disclosure. The method 800 can be implemented, for example, in any of the tamper detection modules 118a-n and/or the tamper detection configuration module 210 of FIG. 1. The method 800 includes generating 802, at a build time of the executable application by a tamper detection configuration module, a tamper detection module configured to compute, at a run time of the executable application, a checksum for a portion of the executable application, the checksum being based on a code location of the portion of the executable application and a code content of the portion of the executable application; compare the checksum to a pre-determined hash value for the portion of the executable application, the hash value being based on the code location of the portion of the executable application and the code content of the portion of the executable application; and cause, based on the comparison, an alert to be generated in response to determining that the checksum is different from the hash value. The method 800 further includes encoding 804, at the build time by a product build module, the tamper detection module at a pre-determined location in the executable application.

In some embodiments, the tamper detection module is a first tamper detection module and the pre-determined location is a first pre-determined location. The method 800 further includes generating 806, at the build time of the executable application by the tamper detection configuration module, a second tamper detection module encoded at a second pre-determined location in the executable application, the second pre-determined location being different from the first pre-determined location, where the first tamper detection module is further configured to: determine, at the run time of the executable application, whether the second tamper detection module is not present at the second pre-determined location in the executable application; and causing the alert to be generated in response to determining that the second tamper detection module is not present at the second pre-determined location in the executable application. The method 800 further includes encoding 808, at the build time by a product build module, the second tamper detection module at a pre-determined location in the executable application.

In some embodiments, the portion of the executable application is a first portion, the checksum is a first checksum, and the hash value is a first hash value. In this example, the second tamper detection module is configured to: compute, at the run time of the executable application, a second checksum for a second portion of the executable application, the second checksum being based on a code location of the second portion of the executable application and a code content of the second portion of the executable application; compare the second checksum for the second portion of the executable application to a pre-determined second hash value for the second portion of the executable application, the second hash value being based on the code location of the second portion of the executable application and the code content of the second portion of the executable application; and cause, based on the comparison, the alert to be generated in response to determining that the second checksum is different from the second hash value.

In some embodiments, the second tamper detection module is further configured to: determine, at the run time of the executable application, whether the first tamper detection module is not present at the first pre-determined location in the executable application; and cause the alert to be generated in response to determining that the first tamper detection module is not present at the first pre-determined location in the executable application. In some embodiments, the tamper detection module is further configured to send a tamper detection message to a server in response to causing the alert to be generated. In some embodiments, the method 800 includes computing 810, by the product build module, the pre-determined hash value, and encoding 812, by the product build module, the pre-determined hash value into the executable application at the build time of the executable application.

Figure 9:
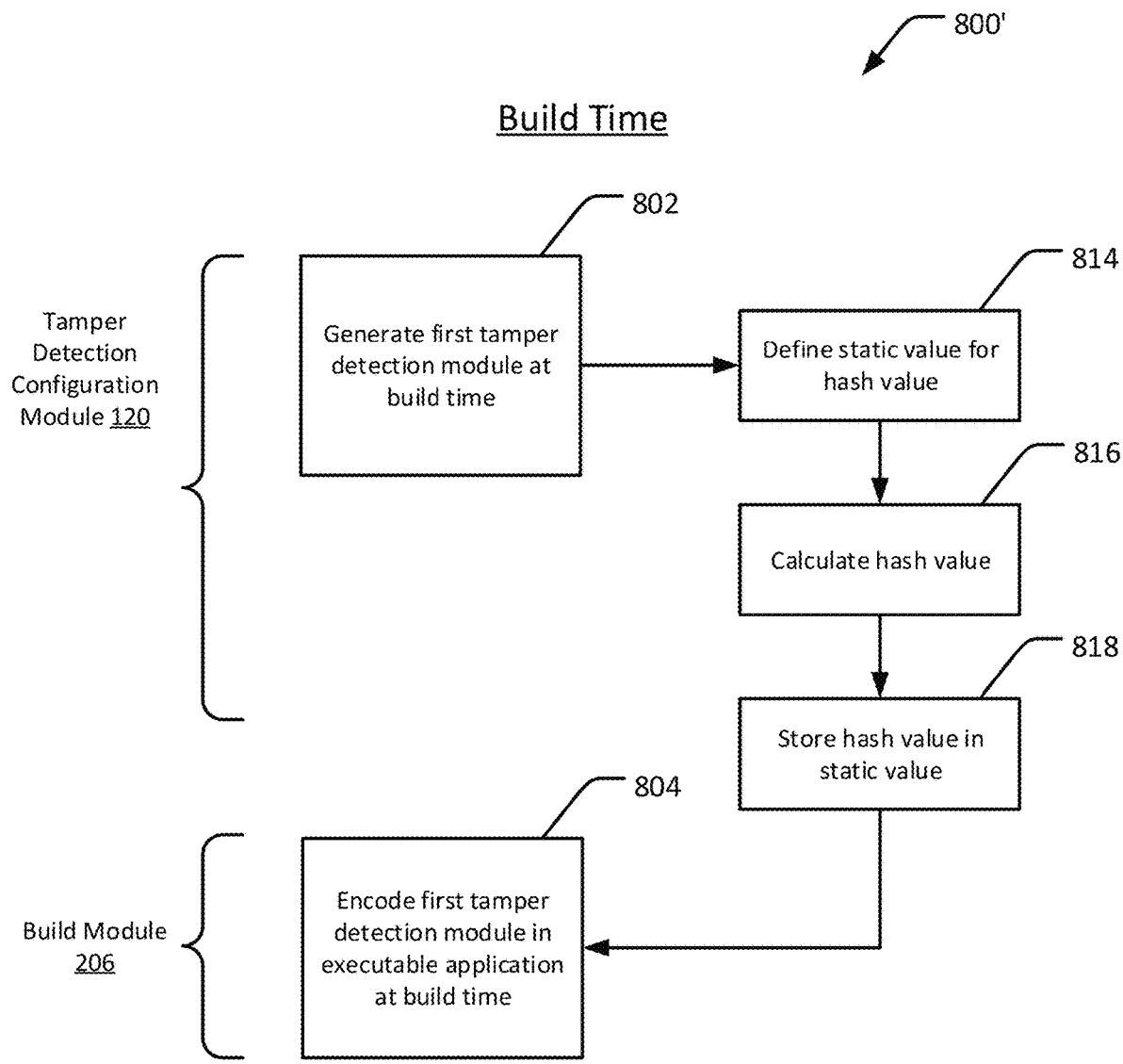
FIG. 9 is a flow diagram of another example methodology for building an executable application with a tamper detection module for detecting tampering or modification of the executable application, in accordance with an embodiment of the present disclosure.

FIG. 9 is a flow diagram of another example methodology 800' for building an executable application with a tamper detection module for detecting tampering or modification, in accordance with an embodiment of the present disclosure. In some embodiments, the method 800' includes defining 814, at the build time by the tamper detection configuration module, a static value for storing the pre-determined hash value within the executable application; calculating 816, at the build time by the tamper detection configuration module, the pre-determined hash value based at least in part on the code location of the portion of the executable application and the code content of the portion of the executable application; and storing 818, at the build time by the tamper detection configuration module, the pre-determined hash value in the static value.

In some embodiments, the method 800' includes encoding 804, by a build module, the tamper detection module and the pre-determined hash value into the executable application at the build time of the executable application. As noted above, the tamper detection modules and the hash values are generated at the build time of the executable application, as opposed to the run time. For instance, in some embodiments, the method 800 includes defining 814, at the build time by the tamper detection configuration module, a static value for storing the pre-determined hash value within the executable application, calculating 816, at the build time by the tamper detection configuration module, the pre-determined hash value based at least in part on the code location of the portion of the executable application and the code content of the portion of the executable application, and storing 818, at the build time by the tamper detection configuration module, the pre-determined hash value in the static value.

For example, the product build module 106 can use dbghelp.dll by Microsoft Corp., which is configured to read the binary images of the executable application from a program database (PDB) file. The product build module 106 is executed at product build time, such as described with respect to FIGS. 8 and 9. Functions such as license verification or product activation can be considered as code sections of the executable application that are to be monitored for tampering. The function names and product binary location are given as the input to the product build module. The product build module uses different application programming interfaces (APIs) from dbghelp.dll to identify the address location and size of each function in the executable application. Different dbghelp.dll APIs used include getModuleInfo, loadSymbol, getModuleInfo, and symbolFromName. The product build module calculates the location (offset) of each function in the executable application, reads the function content (such as hexadecimal values), and calculates a hash value based on the location and the function content. Hardening variables (such as function offset, function size, original checksum) are defined using dummy values. The product build module locates the hardening variables in the executable application and patches the dummy values with the original values at build time.

Additional Examples

Example 1 provides a method for detecting tampering within an executable application. The method includes computing, at a run time of the executable application by a first tamper detection module encoded in the executable application, a checksum for a portion of the executable application, the checksum being based on a code location of the portion of the executable application and a code content of the portion of the executable application; comparing, by the first tamper detection module, the checksum to a pre-determined hash value for the portion of the executable application, the hash value being pre-determined at a build time of the executable application and further being based on the code location of the portion of the executable application and the code content of the portion of the executable application; determining, at the run time of the executable application by the first tamper detection module, whether a second tamper detection module encoded in the executable application is not present at a pre-determined location in the executable application, the pre-determined location being determined at the build time of the executable application; and causing, based on the comparison and by the tamper detection module, an alert to be generated in response to at least one of determining that the checksum is different from the hash value and determining that the second tamper detection module is not present at the pre-determined location in the executable application.

Example 2 includes the subject matter of Example 1, where the portion of the executable application is a first portion, the checksum is a first checksum, and the hash value is a first hash value, and where the method further includes computing, at the run time of the executable application by the second tamper detection module, a second checksum for a second portion of the executable application, the second checksum being based on a code location of the second portion of the executable application and a code content of the second portion of the executable application; comparing, by the second tamper detection module, the second checksum for the second portion of the executable application to a pre-determined second hash value for the second portion of the executable application, the second hash value being pre-determined at the build time of the executable application and further being based on the code location of the second portion of the executable application and the code content of the second portion of the executable application; and causing, based on the comparison and by the second tamper detection module, the alert to be generated in response to determining that the second checksum is different from the second hash value.

Example 3 includes the subject matter of any of Examples 1-2, where the pre-determined location of the second tamper detection module is a first pre-determined location, and where the method further includes determining, at the run time of the executable application by the second tamper detection module, whether the first tamper detection module is not present at a second pre-determined location in the executable application, the second pre-determined location being determined at the build time of the executable application; and causing, by the second tamper detection module, the alert to be generated in response to determining that the first tamper detection module is not present at the second pre-determined location in the executable application.

Example 4 includes the subject matter of any of Examples 1-3, the method further including causing, by the tamper detection module, a tamper detection message to be sent to a remote server in response to causing the alert to be generated.

Example 5 includes the subject matter of any of Examples 1-4, the method further including encoding, by a product build module and at the build time of the executable application, the tamper detection module and the pre-determined hash value into the executable application.

Example 6 includes the subject matter of any of Examples 1-5, the method further including defining, at the build time by a tamper detection configuration module, a static value for storing the pre-determined hash value within the executable application; calculating, at the build time by the tamper detection configuration module, the pre-determined hash value based at least in part on the code location of the portion of the executable application and the code content of the portion of the executable application; and storing, at the build time by the tamper detection configuration module, the pre-determined hash value in the static value.

Example 7 includes the subject matter of any of Examples 1-6, where the code location of the portion of the executable application is offset from a base address of the executable application.

Example 8 provides a method for building an executable application with a tamper detection module configured to detect tempering or modification. The method includes generating, at a build time of the executable application by a tamper detection configuration module, a first tamper detection module configured to compute, at a run time of the executable application, a checksum for a portion of the executable application, the checksum being based on a code location of the portion of the executable application and a code content of the portion of the executable application, compare the checksum to a pre-determined hash value for the portion of the executable application, the hash value being based on the code location of the portion of the executable application and the code content of the portion of the executable application, determine, at the run time of the executable application, whether a second tamper detection module encoded in the executable application is not present at a first pre-determined location in the executable application, and cause, based on the comparison, an alert to be generated in response to at least one of determining that the checksum is different from the hash value and determining that the second tamper detection module is not present at the first pre-determined location in the executable application; and encoding, at the build time by a product build module, the first tamper detection module at a second pre-determined location in the executable application.

Example 9 includes the subject matter of Examples 8, the method further including generating, at the build time of the executable application by the tamper detection configuration module, the second tamper detection module encoded at the first pre-determined location in the executable application, the second pre-determined location being different from the first pre-determined location; wherein the second tamper detection module is further configured to determine, at the run time of the executable application, whether the first tamper detection module is not present at the second pre-determined location in the executable application, and causing the alert to be generated in response to determining that the second tamper detection module is not present at the second pre-determined location in the executable application.

Example 10 includes the subject matter of any of Examples 8-9, where the portion of the executable application is a first portion, the checksum is a first checksum, and the hash value is a first hash value, and where the second tamper detection module is configured to compute, at the run time of the executable application, a second checksum for a second portion of the executable application, the second checksum being based on a code location of the second portion of the executable application and a code content of the second portion of the executable application; compare the second checksum for the second portion of the executable application to a pre-determined second hash value for the second portion of the executable application, the second hash value being based on the code location of the second portion of the executable application and the code content of the second portion of the executable application; and cause, based on the comparison, the alert to be generated in response to determining that the second checksum is different from the second hash value.

Example 11 includes the subject matter of any of Examples 8-10, where the second tamper detection module is further configured to determine, at the run time of the executable application, whether the first tamper detection module is not present at the first pre-determined location in the executable application; and cause the alert to be generated in response to determining that the first tamper detection module is not present at the first pre-determined location in the executable application.

Example 12 includes the subject matter of any of Examples 8-11, where the tamper detection module is further configured to send a tamper detection message to a server in response to causing the alert to be generated.

Example 13 includes the subject matter of any of Examples 8-12, the method further including computing, by the product build module, the pre-determined hash value; and encoding, by the product build module, the pre-determined hash value into the executable application at the build time of the executable application.

Example 14 includes the subject matter of any of Examples 8-13, the method further including defining, at the build time by the tamper detection configuration module, a static value for storing the pre-determined hash value within the executable application; calculating, at the build time by the tamper detection configuration module, the pre-determined hash value based at least in part on the code location of the portion of the executable application and the code content of the portion of the executable application; and storing, at the build time by the tamper detection configuration module, the pre-determined hash value in the static value.

Example 15 provides a system for detecting tampering within an executable application. The system includes at least one processor and a first tamper detection module encoded in the executable application, executable by the at least one processor, and configured to compute, at a run time of the executable application, a checksum for a portion of the executable application, the checksum being based on a code location of the portion of the executable application and a code content of the portion of the executable application, compare the checksum to a pre-determined hash value for the portion of the executable application, the hash value being pre-determined at a build time of the executable application and further being based on the code location of the portion of the executable application and the code content of the portion of the executable application, determine, at the run time of the executable application, whether a second tamper detection module encoded in the executable application is not present at a first pre-determined location in the executable application, and cause an alert to be generated in response to at least one of determining that the checksum is different from the hash value and determining that the second tamper detection module is not present at the first pre-determined location in the executable application.

Example 16 includes the subject matter of Example 15, where the portion of the executable application is a first portion, the checksum is a first checksum, and the hash value is a first hash value, and where the second tamper detection module is configured to compute, at the run time of the executable application, a second checksum for a second portion of the executable application, the second checksum being based on a code location of the second portion of the executable application and a code content of the second portion of the executable application; compare the second checksum for the second portion of the executable application to a pre-determined second hash value for the second portion of the executable application, the second hash value being pre-determined at the build time of the executable application and further being based on the code location of the second portion of the executable application and the code content of the second portion of the executable application; and cause, based on the comparison, the alert to be generated in response to determining that the second checksum is different from the second hash value.

Example 17 includes the subject matter of any of Examples 15-16, where the pre-determined location of the second tamper detection module is a first pre-determined location, and where the second tamper detection module is configured to determine, at the run time of the executable application, whether the first tamper detection module is not present at a second pre-determined location in the executable application, the second pre-determined location being determined at the build time of the executable application; and cause the alert to be generated in response to determining that the first tamper detection module is not present at the second pre-determined location in the executable application.

Example 18 includes the subject matter of any of Examples 15-17, where the tamper detection module is further configured to cause a tamper detection message to be sent to a remote server in response to causing the alert to be generated.

Example 19 includes the subject matter of any of Examples 15-18, the system further including a tamper detection configuration module configured to define, at the build time, a static value for storing the pre-determined hash value within the executable application; calculate, at the build time, the pre-determined hash value based at least in part on the code location of the portion of the executable application and the code content of the portion of the executable application; and store, at the build time, the pre-determined hash value in the static value.

Example 20 includes the subject matter of any of Examples 15-19, where the code location of the portion of the executable application is offset from a base address of the executable application.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be appreciated, however, that the embodiments may be practiced without these specific details. In other instances, well known operations, components and circuits have not been described in detail so as not to obscure the embodiments. It will be further appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A method for detecting tampering within an executable application, the method comprising:
    encoding, by a product build module and at a build time of the executable application, a first tamper detection module and a pre-determined hash value for a portion of the executable application into the executable application;
    computing, at a run time of the executable application by the first tamper detection module encoded in the executable application, a checksum for [a] the portion of the executable application, the checksum being based on a code address location of the portion of the executable application and a code content of the portion of the executable application;
    comparing, by the first tamper detection module executing at the run time within the executable application, the checksum to the pre-determined hash value for the portion of the executable application, the hash value being generated at a build time of the executable application and encoded in the executable application, and further being based on the code address location of the portion of the executable application offset from a base address of the executable application at the build time and the code content of the portion of the executable application;
    determining, at the run time of the executable application and by the first tamper detection module executing at the run time within the executable application, whether a second tamper detection module encoded in the executable application is not present at a pre-determined location in the executable application, the pre-determined location being determined at the build time of the executable application; and
    disabling, based on the comparison and by the tamper detection module, the executable_application in response to at least one of determining that the checksum is different from the hash value and determining that the second tamper detection module is not present at the pre-determined location in the executable application.

2. The method of claim 1, wherein the portion of the executable application is a first portion, the checksum is a first checksum, and the hash value is a first hash value, and wherein the method further comprises:
    computing, at the run time of the executable application by the second tamper detection module, a second checksum for a second portion of the executable application, the second checksum being based on a code address location of the second portion of the executable application and a code content of the second portion of the executable application;
    comparing, by the second tamper detection module, the second checksum for the second portion of the executable application to a pre-determined second hash value for the second portion of the executable application, the second hash value being generated at the build time of the executable application and encoded in the executable application, and further being based on the code address location of the second portion of the executable application offset from the base address of the executable application at the build time and the code content of the second portion of the executable application; and
    disabling, based on the comparison and by the second tamper detection module, the executable application in response to determining that the second checksum is different from the second hash value.

3. The method of claim 1, wherein the pre-determined location of the second tamper detection module is a first pre-determined location, and wherein the method further comprises:
    determining, at the run time of the executable application by the second tamper detection module, whether the first tamper detection module is not present at a second pre-determined location in the executable application, the second pre-determined location being determined at the build time of the executable application; and
    disabling, by the second tamper detection module, the executable application in response to determining that the first tamper detection module is not present at the second pre-determined location in the executable application.

4. The method of claim 1, further comprising causing, by the tamper detection module, a tamper detection message to be sent to a remote server in response to disabling the executable application.

5. The method of claim 1, further comprising:
    defining, at the build time by a tamper detection configuration module, a static value for storing the pre-determined hash value within the executable application;
    calculating, at the build time by the tamper detection configuration module, the pre-determined hash value based at least in part on the code location of the portion of the executable application and the code content of the portion of the executable application; and storing, at the build time by the tamper detection configuration module, the pre-determined hash value in the static value.

6. A method for building an executable application with a tamper detection module configured to detect tempering or modification, the method comprising:

generating, at a build time of the executable application by a tamper detection configuration module, a first tamper detection module configured to execute within the executable application and to compute, at a run time of the executable application, a checksum for a portion of the executable application, the checksum being based on a code address location of the portion of the executable application and a code content of the portion of the executable application, compare, at the run time of the executable application, the checksum to a pre-determined hash value for the portion of the executable application, the hash value being generated at a build time of the executable application and encoded in the executable application, and further being based on the code address location of the portion of the executable application offset from a base address of the executable application at the build time and the code content of the portion of the executable application, determine, at the run time of the executable application, whether a second tamper detection module encoded in the executable application is not present at a first pre-determined location in the executable application, and disable, at the run time of the executable application and based on the comparison, the executable application in response to at least one of determining that the checksum is different from the hash value and determining that the second tamper detection module is not present at the first pre-determined location in the executable application; and encoding, at the build time by a product build module, the first tamper detection module and the pre-determined hash value at a second pre-determined location in the executable application.

7. The method of claim 6, further comprising:

generating, at the build time of the executable application by the tamper detection configuration module, the second tamper detection module encoded at the first pre-determined location in the executable application, the second pre-determined location being different from the first pre-determined location;

wherein the second tamper detection module is further configured to determine, at the run time of the executable application, whether the first tamper detection module is not present at the second pre-determined location in the executable application, and disable the executable application in response to determining that the second tamper detection module is not present at the second pre-determined location in the executable application.

8. The method of claim 6, wherein the portion of the executable application is a first portion, the checksum is a first checksum, and the hash value is a first hash value, and wherein the second tamper detection module is configured to:

compute, at the run time of the executable application, a second checksum for a second portion of the executable application, the second checksum being based on a code address location of the second portion of the executable application and a code content of the second portion of the executable application;

compare the second checksum for the second portion of the executable application to a pre-determined second hash value for the second portion of the executable application, the second hash value being generated at a build time of the executable application and encoded in the executable application, and further being based on the code address location of the second portion of the executable application offset from the base address of the executable application at the build time and the code content of the second portion of the executable application; and disable, based on the comparison, the executable application in response to determining that the second checksum is different from the second hash value.

9. The method of claim 6, wherein the second tamper detection module is further configured to:

determine, at the run time of the executable application, whether the first tamper detection module is not present at the first pre-determined location in the executable application; and disable the executable application in response to determining that the first tamper detection module is not present at the first pre-determined location in the executable application.

10. The method of claim 6, wherein the tamper detection module is further configured to send a tamper detection message to a server in response to disabling the executable application.

11. The method of claim 6, further comprising:

computing, by the product build module, the pre-determined hash value; and encoding, by the product build module, the pre-determined hash value into the executable application at the build time of the executable application.

12. The method of claim 6, further comprising:

defining, at the build time by the tamper detection configuration module, a static value for storing the pre-determined hash value within the executable application;

calculating, at the build time by the tamper detection configuration module, the pre-determined hash value based at least in part on the code location of the portion of the executable application and the code content of the portion of the executable application; and storing, at the build time by the tamper detection configuration module, the pre-determined hash value in the static value.

13. A system for detecting tampering within an executable application, the system comprising:

at least one processor;

a non-transitory storage medium operatively coupled to the at least one processor and configured to store instructions that when executed by the at least one processor cause the at least one processor to execute the executable application; and a first tamper detection module encoded in the executable application and configured to execute within the executable application, executable by the at least one processor, and configured to compute, at a run time of the executable application, a checksum for a portion of the executable application, the checksum being based on a code address location of the portion of the executable application and a code content of the portion of the executable application, compare, at the run time of the executable application, the checksum to a pre-determined hash value for the portion of the executable application, the hash value being generated at a build time of the executable application and encoded in the executable application, and further being based on the code address location of the portion of the executable application offset from a base address of the executable application at the build time and the code content of the portion of the executable application, determine, at the run time of the executable application, whether a second tamper detection module encoded in the executable application is not present at a first pre-determined location in the executable application, and disable the executable application in response to at least one of determining that the checksum is different from the hash value and determining that the second tamper detection module is not present at the first pre-determined location in the executable application, wherein the instructions that when executed by the at least one processor further cause the at least one processor to encode, by a product build module and at a build time of the executable application, the first tamper detection module and the pre-determined hash value into the executable application.

14. The system of claim 13, wherein the portion of the executable application is a first portion, the checksum is a first checksum, and the hash value is a first hash value, and wherein the second tamper detection module is configured to:

compute, at the run time of the executable application, a second checksum for a second portion of the executable application, the second checksum being generated at a build time of the executable application and encoded in the executable application, and further being based on a code address location of the second portion of the executable application and a code content of the second portion of the executable application;

compare the second checksum for the second portion of the executable application to a pre-determined second hash value for the second portion of the executable application, the second hash value being pre-determined at the build time of the executable application and further being based on the code address location of the second portion of the executable application offset from the base address of the executable application at the build time and the code content of the second portion of the executable application; and disable, based on the comparison, the executable application in response to determining that the second checksum is different from the second hash value.

15. The system of claim 13, wherein the pre-determined location of the second tamper detection module is a first pre-determined location, and wherein the second tamper detection module is configured to:

determine, at the run time of the executable application, whether the first tamper detection module is not present at a second pre-determined location in the executable application, the second pre-determined location being determined at the build time of the executable application; and disable the executable application in response to determining that the first tamper detection module is not present at the second pre-determined location in the executable application.

16. The system of claim 13, wherein the tamper detection module is further configured to cause a tamper detection message to be sent to a remote server in response to disabling the executable application.

17. The system of claim 13, further comprising a tamper detection configuration module configured to:

define, at the build time, a static value for storing the pre-determined hash value within the executable application;

calculate, at the build time, the pre-determined hash value based at least in part on the code location of the portion of the executable application and the code content of the portion of the executable application; and store, at the build time, the pre-determined hash value in the static value.

\* \* \* \* \*